March 7, 1944.  A. B. MILLER  2,343,419
REMOTE CONTROL SYSTEM
Original Filed July 22, 1941
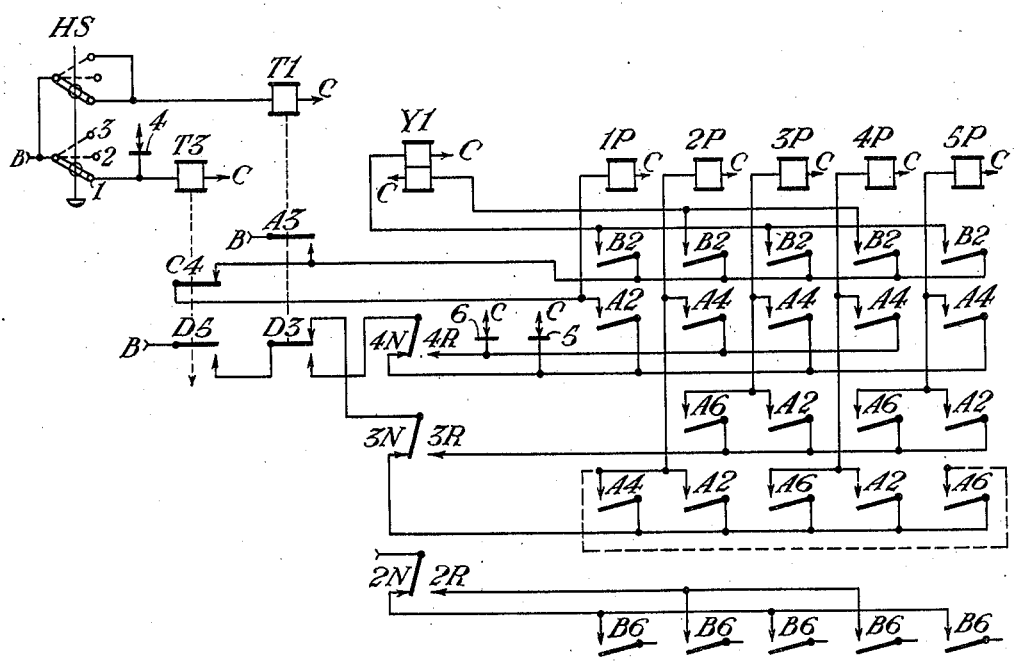
INVENTOR
Alfred B. Miller
BY
HIS ATTORNEY Patented Mar. 7, 1944

2,343,419

UNITED STATES PATENT OFFICE 2,343,419

REMOTE CONTROL SYSTEM

Alfred B. Miller, Edgewood, Pa., assignor to The Union Switch & Signal Company, Swissvale, Pa., a corporation of Pennsylvania Original application July 22, 1941, Serial No. 403,494. Divided and this application April 6, 1943, Serial No. 481,990

4 Claims. (Cl. 177—353)

My invention relates to remote control systems of the impulse code type, and more particularly, to circuits for controlling a series of stepping relays adapted for use in such systems.

This application is a division of my copending application, Serial No. 403,494, filed July 22, 1941, for Remote control systems.

The circuits of my invention include means for operating the first stepping relay of a series in response to the first of a series of operations of a control relay to its reverse position, and for then operating the remaining stepping relays one at a time in order in response to the repeated operation of the control relay to its normal position.

One object of my invention is the provision of means for insuring that unless the stepping relays respond properly one at a time to the impulses as received, all of the relays will be deenergized and the circuits they control will be opened so that no improper operation of devices governed by the relays can occur. A feature of my invention is the provision of an auxiliary relay of the stick polar type, which is operated from its existing position to its opposite position by each stepping relay in turn, to prepare a stick circuit for such stepping relay and to also prepare a pick-up circuit for the next stepping relay of the series. Another feature of my invention is the provision of two stick circuits for each except the first stepping relay of the series, one of which is closed immediately after the relay picks up, and the other after the control and auxiliary relays have shifted in position in preparation for picking up the next stepping relay of the series, the arrangement being such that only one stepping relay is energized at any time.

I shall describe one form of apparatus embodying my invention and shall then point out the novel features thereof in claims.

Referring to the accompanying drawing, the reference characters 1P to 5P, inclusive, designate the series of stepping relays and relay Y1 is the auxiliary stick polar relay. Relay T1 is a normally energized control relay, for governing the operation of these relays, which may be controlled by a series of impulses in any desired manner. For example, relay T1 may be a line relay like the relay R1 or R2 of my copending application hereinbefore referred to, or it may be a transmitter relay controlled by the stepping relays for delivering a series of impulses to a line circuit, like the relay T1 of my copending application. Relay T3 is a cycle marking relay like relay R3 or T3 of my copending application, which is operated from its normal position to a reverse position following the first of a series of operations of relay T1 to its reverse position, relay T3 remaining reversed until relay T1 is restored to normal at the end of the series. In order to simplify the drawing, I have illustrated relays T1 and T3 as controlled by the operation of a hand stepping switch HS, and in lieu of showing a local source of current for energizing the various relays, I have shown only the terminals of the source, these being designated by the reference characters B and C, referring respectively to the positive or supply terminal and to the common return terminal of the source.

Normally, the switch HS occupies a normal position, as shown, in which relays T1 and T3 are both energized in their normal positions. To operate the stepping relays 1P to 5P through a cycle, the switch HS is moved from its normal position 1, as shown, to a center position 2, thereby opening the circuits for relays T1 and T3 to cause these relays to assume a reverse position, and is then moved back and forth between positions 2 and 3 to supply a series of impulses to relay T1 to operate it repeatedly to its normal position. To terminate the cycle switch HS is returned to position 1 in which relays T1 and T3 are both energized.

Relay 1P is picked up in response to the first reversal of relay T1, before relay T3 releases, over a pickup circuit extending from terminal B at back contact A3 of relay T1, front contact C4 of relay T3 through the winding of relay 1P to terminal C. Relay T3 is made sufficiently slow release to allow relay 1P to pick up over the circuit just traced by the provision of an electronic rectifier 4 connected across its terminals, as shown.

When relay 1P picks up, it completes an energizing circuit for relay Y1 extending from terminal B at contact A3 of relay T1, contact B2 of relay 1P through the upper winding of relay Y1 to terminal C. Relay Y1 is thereby energized in the normal direction as shown, and preparing stick circuit for holding relay P1 energized after relay T3 releases, extending from terminal B at back contact D5 of relay T3 over back contact D3 of relay T1, normal contact 4N of relay Y1, front contact A2 and winding of relay 1P to terminal C.

When relay T1 is operated to normal in response to the first impulse of the series, relay Y1, which is of the stick polar type, remains in its left-hand position as shown, and relay 1P although disconnected from terminal B remains picked up due to the discharge path provided over its contact A2 and rectifier 5, for a time sufficient to allow the next stepping relay 2P of the series to assume its energized condition, and relay 2P picks up over the circuit extending from terminal B at back contact D5 of relay T3, front contact D3 of relay T1, normal contact 3N of relay Y1, front contact A4 of relay 1P and the winding of relay 2P to terminal C. Relay 2P has two stick circuits, the first of which is now closed, being the same as the pick-up circuit just traced, except that it includes contact A2 of relay 2P in place of contact A4 of relay 1P, and consequently relay 2P remains picked up after relay 1P releases.

When relay T1 is operated to reverse upon the termination of the first impulse, if relay 2P has responded as described, relay Y1 is energized in the reverse direction over the circuit extending from the terminal B at back contact A3 of relay T1, contact B2 of relay 2P through the lower winding of relay Y1 to terminal C. Relay 2P although temporarily disconnected from terminal B remains picked up due to the provision of rectifier 6, which is connected across the winding of relay 2P over its contact A4, long enough to allow relay Y1 to reverse. After relay Y1 reverses, relay 2P is held energized over its second stick circuit extending from terminal B at back contact D5 of relay T1, back contact D3 of relay T1, reverse contact 4R of relay Y1, front contact A4 and winding of relay 2P to terminal C.

When relay T1 is operated to normal in response to the second impulse of the series, relay Y1 is deenergized but remains in its reverse position, relay 2P remains picked up for a brief period due to the current flow through its winding and rectifier 6, and relay 3P picks up over a circuit similar to that for relay 2P except that it includes contact 3R of relay Y1 and contact A6 of relay 2P, and relay 3P similarly completes a stick circuit at its contact A2.

When relay T1 is operated to reverse at the end of the second impulse, relay Y1 is operated to normal over the circuit including contact B2 of relay 3P, thereby completing the second stick circuit for relay 3P over its own contact A4 and contact 4N of relay Y1.

In a similar manner, relays 4P and 5P are operated in response to the third and fourth operations of relay T1 to normal, whereupon the stepping operations may either be terminated or if contact A6 of relay 5P is connected to relay 2P as indicated by a dotted line in the drawing, relays 2P to 5P may be operated through a second cycle in response to four additional impulses. In any case, when the switch HS is restored to normal to terminate a series of impulses, relay T3 will become reenergized to release the last operated stepping relay, thereby restoring the apparatus to normal. If an odd number of impulses have been received, relay Y1 will be left reversed, but this is immaterial, because relay Y1 will be restored to normal by relay 1P at the beginning of the next series.

Contacts B6 of the stepping relays provide a series of circuits which may be completed successively over contacts 2N and 2R of relay Y1, for use as required, with the assurance that only one of these circuits will be completed at a time, since the relays which control them are energized only one at a time, and their operation is terminated, with none of the stepping relays energized, if any stepping relay fails to respond to the corresponding impulse of a series.

Although I have herein shown and described but one form of my invention, it is understood that various changes and modifications may be made therein within the scope of the appended claims without departing from the spirit and scope of my invention.

Having thus described my invention, what I claim is:

1. In combination with a control relay, impulsing means for operating said control relay repeatedly, a series of stepping relays adapted to be operated one at a time in order in response to repeated operations of said control relay, a cycle marking relay, an auxiliary relay of the stick polar type, a pick-up circuit for the first stepping relay of said series including a normal contact of said cycle marking relay and a reverse contact of said control relay, a stick circuit for said first stepping relay including its own front contact and a reverse contact of said cycle marking relay, a pick-up circuit for each stepping relay except the first including a normal contact of said control relay, a reverse contact of said cycle marking relay, and a normal or a reverse contact of said auxiliary relay, and a front contact of the next preceding stepping relay of the series, a first stick circuit for each stepping relay except the first which is the same as its pick-up circuit except that it includes its own front contact in place of the front contact of the next preceding stepping relay, a circuit prepared by each energized stepping relay and completed over reverse contacts of said control relay for operating said auxiliary relay to normal or reverse as required to prepare the pick-up circuit for the next stepping relay of the series, a second stick circuit for each stepping relay except the first including reverse contacts of said control relay and of said cycle marking relay and also including a normal or reverse contact of said auxiliary relay closed in response to the operation of that relay by such stepping relay, and means for operating said cycle marking relay to reverse when the first stepping relay of the series picks up and for maintaining it reversed until the last stepping relay of the series is picked up.

2. In combination with a remote control system, a control relay, impulsing means for operating said control relay repeatedly, a series of stepping relays, an auxiliary two position relay controlled by said stepping relays, and means for energizing each of a plurality of said stepping relays only one at a time, comprising means controlled by said stepping relays for operating said auxiliary relay from its existing position to its opposite position each time said control relay is operated to reverse, a pick-up circuit for each stepping relay of said plurality each including a front contact of the next preceding stepping relay and a contact of said control relay closed each time said control relay is operated to normal, a stick circuit for holding such stepping relay energized including a contact of said control relay closed in its normal position and a contact of said auxiliary relay closed in response to the last preceding operation of said control relay to reverse, and a second stick circuit for holding such stepping relay energized including a contact of said control relay closed when said control relay is next operated to its reverse position and a contact of said auxiliary relay closed in response to the same operation of said control relay to its reverse position.

3. In combination, a control relay operable repeatedly from a normal to a reverse position, a series of stepping relays, a stick polar relay, a circuit for the first stepping relay of the series including a reverse contact of the control relay and a contact closed only during the first of a series of reversals of said control relay; a circuit for each remaining stepping relay, the circuit for each such relay including a front contact of the next preceding relay of the series bridged by its own front contact, and in series therewith, a normal contact of said control relay, the circuits for alternate relays of the series also including a normal contact, and those for the intervening relays a reverse contact of said stick polar relay, a stick circuit for each stepping relay including its own front contact and a reverse contact of the control relay, the stick circuits for said alternate relays also including a reverse contact and those for said intervening relays a normal contact of the stick polar relay; and circuits closed successively over front contacts of the stepping relays, each including a reverse contact of the control relay, for operating the stick polar relay alternately to reverse and to normal in response to the repeated reversal of said control relay, so arranged that the stick polar relay is operated to normal in response to the first reversal of said control relay.

4. In combination, a control relay operable repeatedly from a normal to a reverse position, a cycle marking relay operable to a reverse position for the duration of the repeated operation of said control relay, a series of stepping relays, a stick polar relay, a circuit for the first stepping relay of the series including a reverse contact of the control relay and a normal contact of the cycle marking relay, a circuit for each remaining stepping relay, the circuit for each such relay including a front contact of the next preceding relay of the series bridged by its own front contact, and in series therewith, a normal contact of said control relay and a reverse contact of said cycle marking relay, the circuits for alternate relays of the series also including a normal contact, and those for the intervening relays, a reverse contact of said stick polar relay, a stick circuit for each stepping relay including its own front contact and reverse contacts of said control and cycle marking relays, the stick circuits for said alternate relays also including a reverse contact, and those for said intervening relays a normal contact of said stick polar relay; and circuits closed successively over front contacts of the stepping relays, each including a reverse contact of the control relay for operating the stick polar relay alternately to reverse and to normal in response to the repeated reversal of said control relay, so arranged that the stick polar relay is operated to normal in response to the first reversal of said control relay.

ALFRED B. MILLER.